United States Patent
Lei et al.

(10) Patent No.: US 9,239,720 B2
(45) Date of Patent: Jan. 19, 2016

(54) DEVICE AND METHOD FOR GENERATING APPLICATION MODEL BASED ON LAYERED STRUCTURE

(71) Applicant: China Unionpay Co., Ltd., Shanghai (CN)

(72) Inventors: Ping Lei, Shanghai (CN); Bin Chen, Shanghai (CN); Ji-en Zhou, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 14/364,665

(22) PCT Filed: Dec. 13, 2012

(86) PCT No.: PCT/CN2012/086578
§ 371 (c)(1),
(2) Date: Jun. 11, 2014

(87) PCT Pub. No.: WO2013/087008
PCT Pub. Date: Jun. 20, 2013

(65) Prior Publication Data
US 2014/0310682 A1    Oct. 16, 2014

(30) Foreign Application Priority Data
Dec. 14, 2011    (CN) .......................... 2011 1 0418071

(51) Int. Cl.
*G06F 9/44*    (2006.01)
(52) U.S. Cl.
CPC .. *G06F 8/71* (2013.01); *G06F 8/10* (2013.01); *G06F 8/33* (2013.01); *G06F 8/35* (2013.01)

(58) Field of Classification Search
CPC ..................................... G06F 8/10; G06F 8/33
USPC .................................................. 717/104, 110
See application file for complete search history.

(56) References Cited

U.S. PATENT DOCUMENTS 5,799,193 A *    8/1998   Sherman et al. .............. 717/105
8,073,671 B2 *  12/2011   Papaefstathiou et al. ....... 703/22
(Continued)

FOREIGN PATENT DOCUMENTS

| CN | 1912830 A | 8/2006 |
|---|---|---|
| CN | 101425010 A | 5/2009 |
| WO | WO 2011/086571 A1 | 7/2011 |

OTHER PUBLICATIONS

Office Action in Chinese Application No. 201110418071.X dated Jul. 3, 2015, with English Translation. 9 pages.
(Continued)

*Primary Examiner* — Phillip H Nguyen
(74) *Attorney, Agent, or Firm* — Blakely Sokoloff Taylor & Zafman LLP

(57) ABSTRACT

This disclosure presents an application model generation device and method based on hierarchy structure. A user may build an algorithm factor configuration instructions based on the actual application demands before implementing the application model, and update and/or modify one or more of the algorithm factors by means of the algorithm factor configuration instructions, and thus implementing flexible expansion for the application model. The application model generation device and method based on hierarchy structure as disclosed herein have flexible expandability, and the configuration efficiency is increased and the complexity in the configuration process is decreased duo to the implementation of the reusability of the algorithm factors, the meta-application algorithm units and the scenarios.

17 Claims, 3 Drawing Sheets

(56) References Cited

U.S. PATENT DOCUMENTS

2002/0194038 A1 12/2002 Sauser et al.
2008/0120593 A1 5/2008 Keren et al.
2010/0153909 A1* 6/2010 Batey et al. .................. 717/104
2011/0258138 A1* 10/2011 Kulkarni et al. .............. 705/348

OTHER PUBLICATIONS

Supplementary Search Report in EP Patent Application No. 12858559.3 dated Jul. 6, 2015. 5 pages.

* cited by examiner

DEVICE AND METHOD FOR GENERATING APPLICATION MODEL BASED ON LAYERED STRUCTURE

TECHNICAL FIELD

The present invention relates to the application model generation device and method, and more particularly, to the application model generation device and method based on hierarchy structure.

BACKGROUND

Nowadays, with the widespread usage of electronic computer application and network communication application, and the increasing enrichment of the business types in different field, the generation and utilization of application models (i.e., the template based on which application programs executes) for complex business (such as financial transitions) become more and more important.

The basic operation principle of existing application model generation devices and methods is as follows. A person responsible for configuration, rather than one responsible for the transaction, manually configures the parameters of an application model for a specific application transaction, such as a charging transaction in the financial field, and the parameter configuration mode cannot be re-used when there are a plurality of similar application models that use the same parameter configuration mode (e.g., those employs the same algorithm unit or parameter type). That is, when multiple application models contain the same elements, the person responsible for configuration cannot re-use these elements.

However, the existing application model generation device and methods have the following disadvantage: (1) because the parameters of the application models need to be manually configured for a specific application transaction, its expandability and maintainability are poor, and thus they fail to meet the requirements for increasingly complicated transaction types, and (2) because the same elements in different application models cannot be re-used, the efficiency of configuration is low and the complexity of the configuration procedure is increased.

Hence, there is a need for the application model generation device and method that have high expandability and configuration efficiency, wherein the same sub-modules can be re-used.

SUMMARY

In order to overcome the aforementioned disadvantages in the existing solutions, an application model generation device and method based on hierarchy structure are proposed in this disclosure.

The objects of the present invention are implemented by the following technical solutions:

An application model generation device based on hierarchy structure, comprising: a meta-application algorithm unit updating and storage module, configured to store at least one meta-application algorithm units, and update and/or modify one or more of the at least one meta-application algorithm units based on the received configuration instructions;

a scenario generation and storage module, configured to generate and store at least one scenario defined by a scenario file based on the received configuration instructions, wherein the scenario consists of a set of the meta-application algorithm units;

an application model generation and storage module, configured to generate and store at least one application models defined by the application model file based on the received configuration instructions, wherein the application model consists of a set of the scenarios;

an algorithm factor updating and storage module, configured to store the algorithm factors used by the at least one meta-application algorithm units, and update and/or modify one or more of the algorithm factors based on the configuration instructions;

a user interface, configured to receive configuration instructions from the user, and transmit the configuration instructions to one of the meta-application algorithm unit updating and storage module, the scenario generation and storage module, the application model generation and storage module and the algorithm factor updating and storage module based on the type of the configuration instructions.

In the solution as disclosed above, preferably, the application model generation device based on hierarchy structure further includes an application model execution module configured to implement one of the at least one application model defined by the application model file based on a received execution instruction.

In the solution as disclosed above, preferably, the user interface is further configured to receive the execution instruction from the user and transmit the execution instruction to the application model execution module.

In the solution as disclosed above, preferably, the scenario generation and storage module is further configured to update and/or modify one or more of the at least one scenarios based on the received configuration instructions.

In the solution as disclosed above, preferably, the application model generation and storage module is further configured to update and/or modify one or more of the at least one application models based on the received configuration instructions.

In the solution as disclosed above, preferably, each of the at least one scenarios corresponds to each application scenario of an application demand respectively.

In the solution as disclosed above, preferably, each of the at least one application models corresponds to each application scheme of an application demand respectively.

In the solution as disclosed above, preferably, each of the at least one meta-application algorithm units corresponds to each most basic function unit of an application demand respectively.

In the solution as disclosed above, preferably, each of the algorithm factors has a unique algorithm factor identifier associated with it.

In the solution as disclosed above, preferably, each of the at least one meta-application algorithm units includes at least one algorithm factor identifier, and is configured to call the algorithm factors corresponding to the at least one algorithm factor identifiers by means of the at least one algorithm factor identifiers.

In the solution as disclosed above, preferably, each of the at least one meta-application algorithm units has a unique meta-application algorithm unit identifier associated with it.

In the solution as disclosed above, preferably, the scenario file includes at least one meta-application algorithm unit identifiers, and call the meta-application algorithm units corresponding to the at least one meta-application algorithm unit identifiers by mean of the at least one meta-application algorithm unit identifiers, wherein the meta-application algorithm units corresponding to the at least one meta-application algorithm unit identifiers constitutes the scenarios defined by the scenario file.

In the solution as disclosed above, preferably, each of the at least one scenarios has a unique scenario identifier associated with it.

In the solution as disclosed above, preferably, the application model file includes at least one scenario identifiers, and is configured to call the scenarios corresponding to the at least one scenario identifiers by means of the at least one scenario identifiers, wherein the scenarios corresponding to the at least one scenario identifiers constitute the application model defined by the application model file.

In the solution as disclosed above, preferably, each of the at least one application models has a unique application model identifier associated with it.

In the solution as disclosed above, preferably, the execution instruction includes an application model identifier.

In the solution as disclosed above, preferably, the application model execution model implements the application model associated with the application model identifier based on the application model identifier in the received execution instruction.

In the solution as disclosed above, preferably, the types of the configuration instruction includes "meta-application algorithm unit configuration instruction," "scenario configuration instruction," "application model configuration instruction," and "algorithm factor configuration instruction."

In the solution as disclosed above, preferably, the configuration instruction is built by the user based on actual application demand.

In the solution as disclosed above, preferably, the algorithm factor configuration instructions are built by the user based on actual application demands before implementing the application model, and one or more of the algorithm factors can are updated and/or modified by means of the algorithm factor configuration instructions.

In the solution as disclosed above, preferably, the scenario configuration instructions are built by the user according to the scenario factors.

In the solution as disclosed above, preferably, the same algorithm factor can be used in different meta-application algorithm units.

In the solution as disclosed above, preferably, the same meta-application algorithm unit can be used in different scenarios.

In the solution as disclosed above, preferably, the same scenario can be used in different application models.

The objects of the present invention can also be implemented by the following technical solutions:

An application model generation method based on hierarchy structure, comprising the steps of:

(A1) configuring and storing at least one meta-application algorithm unit based on the configuration instructions from the user;

(A2) generating and storing at least one scenario defined by a scenario file based on the configuration instructions from the user, wherein the scenario consists of a set of the meta-application algorithm units;

(A3) generating and storing at least one application model defined by an application model file based on the configuration instructions from the user, wherein the application model consists of a set of the scenarios;

(A4) configuring and storing the algorithm factors used by the at least one meta-application algorithm units based on the configuration instructions from the user;

(A5) implementing one of the at least one application models defined by the application model file based on the execution instructions from the user.

In the solution as disclosed above, preferably, the step (A1) further includes: updating and/or modifying one or more of the at least one meta-application algorithm units based on the configuration instructions from the user.

In the solution as disclosed above, preferably, the step (A2) further includes: updating and/or modifying one or more of the at least one scenario based on the configuration instructions from the user.

In the solution as disclosed above, preferably, the step (A3) further includes: updating and/or modifying one or more of the at least one application models based on the configuration instructions from the user.

In the solution as disclosed above, preferably, each of the at least one scenarios corresponds to each application scenario of an application demand respectively.

In the solution as disclosed above, preferably, each of the at least one application models corresponds to each application scheme of an application demand respectively.

In the solution as disclosed above, preferably, each of the at least one meta-application algorithm units corresponds to each most basic function unit of an application demand respectively.

In the solution as disclosed above, preferably, each of the algorithm factors has a unique algorithm factor identifier associated with it.

In the solution as disclosed above, preferably, each of the at least one meta-application algorithm units includes at least one algorithm factor identifier, and is configured to call the algorithm factors corresponding to the at least one algorithm factor identifiers by means of the at least one algorithm factor identifiers.

In the solution as disclosed above, preferably, each of the at least one meta-application algorithm units has a unique meta-application algorithm unit identifier associated with it.

In the solution as disclosed above, preferably, the scenario file includes at least one meta-application algorithm unit identifiers, and the meta-application algorithm units corresponding to the at least one meta-application algorithm unit identifiers is called by means of the at least one meta-application algorithm unit identifiers, wherein the meta-application algorithm units corresponding to the at least one meta-application algorithm unit identifiers constitutes the scenarios defined by the scenario file.

In the solution as disclosed above, preferably, each of the at least one scenarios has a unique scenario identifier associated with it.

In the solution as disclosed above, preferably, the application model file includes at least one scenario identifiers, and the scenarios corresponding to the at least one scenario identifiers are called by means of the at least one scenario identifiers, wherein the scenarios corresponding to the at least one scenario identifiers constitute the application model defined by the application model file.

In the solution as disclosed above, preferably, each of the at least one application models has a unique application model identifier associated with it.

In the solution as disclosed above, preferably, the execution instruction includes an application model identifier.

In the solution as disclosed above, preferably, the step (A5) further includes: implementing the application model associated with the application model identifier based on the application model identifier in the execution instruction.

In the solution as disclosed above, preferably, the configuration instruction is built by the user based on the actual application demands.

In the solution as disclosed above, preferably, updating and/or modifying one or more of the algorithm factors based on actual application demands before implementing the application model.

In the solution as disclosed above, preferably, the scenario are configured according to the scenario factors.

In the solution as disclosed above, preferably, the same algorithm factor can be used in different meta-application algorithm units.

In the solution as disclosed above, preferably, the same meta-application algorithm unit can be used in different scenarios.

In the solution as disclosed above, preferably, the same scenario can be used in different application models.

The application model generation device and method based on hierarchy structure as disclosed herein have the following advantages: it has flexible expandability, and thus the increasing application demands can be meet; the configuration efficiency is increased and the complexity of the configuration procedure is decreased duo to the reusability of the algorithm factors, the meta-application algorithm units and the scenarios.

BRIEF DESCRIPTION OF DRAWINGS

The features and advantages of the present invention will be better understood by one skilled in the art in connection with the drawings, in which.

DETAILED DESCRIPTION

Figure 1:
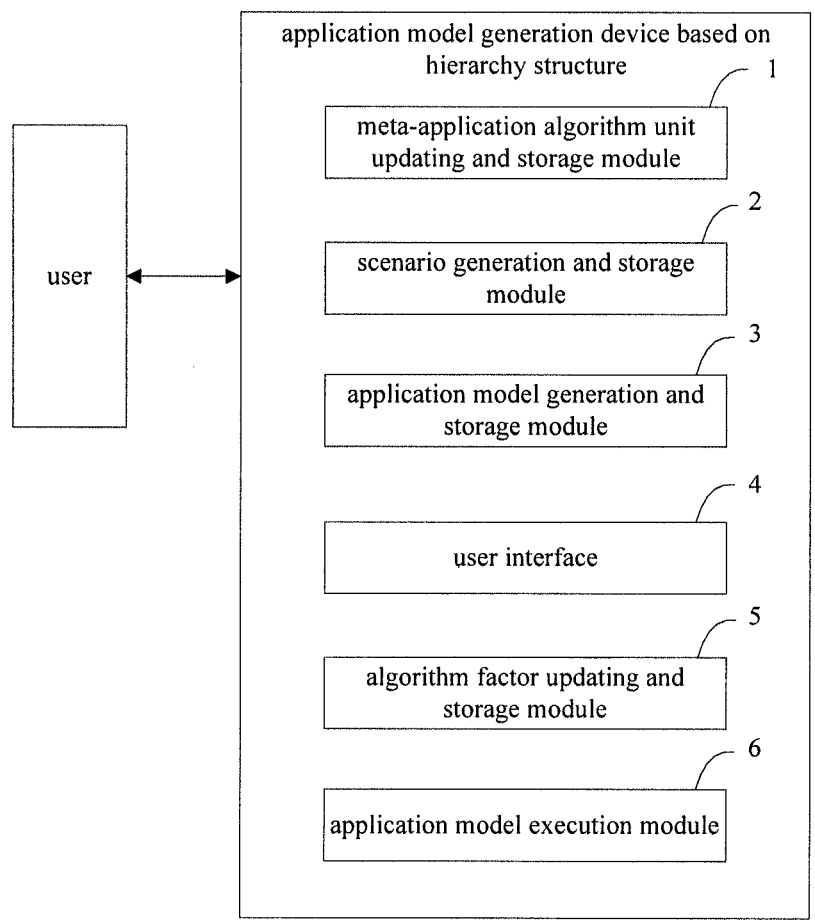
FIG. 1 is the structural view of the application model generation device based on hierarchy structure according to the embodiment of the invention.

FIG. 1 is the structural view of the application model generation device based on hierarchy structure according to the embodiment of the invention. As shown in FIG. 1, the application model generation device based on hierarchy structure as disclosed in the present invention includes a meta-application algorithm unit updating and storage module 1, a scenario generation and storage module 2, an application model generation and storage module 3, a user interface 4, and an algorithm factor updating and storage module 5. The meta-application algorithm unit updating and storage module 1 is configured to store at least one meta-application algorithm units (that is, atom algorithm units, which, in other words, are the smallest algorithm unit (i.e., operation execution unit) separate each other that can perform specific function; for example, in the financial field, the atom algorithm unit can be a "single transaction price making" or a "transaction range algorithm", etc.), and to update and/or modify one or more of the at least one meta-application algorithm units based on the received configuration instructions. The scenario generation and storage module 2 is configured to generate and store at least one scenario defined by a scenario file based on the received configuration instructions, wherein the scenario consists of a set of the meta-application algorithm units, that is, each scenario includes one or more of the meta-application algorithm units. The application model generation and storage module 3 is configured to generate and store at least one application models defined by the application model file based on the received configuration instructions, wherein the application model consists of a set of the scenarios, i.e., each application model includes one or more of the scenarios. The algorithm factor updating and storage module 5 is configured to store the algorithm factors (i.e., parameters such as "transaction type", "fixed amount", or "rate", etc. in the financial field) used by the at least one meta-application algorithm unit, and update and/or modify one or more of the algorithm factors based on the configuration instructions. The user interface 4 is configured to receive the configuration instructions from the user, and transmit the configuration instructions to one of the meta-application algorithm updating and storage module 1, the scenario generation and storage module 2, the application model generation and storage module 3 and the algorithm factor updating and storage module 5 based on the type of the configuration instructions.

Preferably, the application model generation device based on hierarchy structure as disclosed herein further includes an application model execution module 6, which is configured to implement one of the at least one application model defined by the application model file based on the received execution instruction.

Preferably, in the application model generation device based on hierarchy structure as disclosed herein, the user interface 4 is also configured to receive the execution instruction from the user and transmit the execution instruction to the application model execution module 6.

Preferably, in the application model generation device based on hierarchy structure as disclosed herein, the scenario generation and storage module 2 is further configured to update and/or modify one or more of the at least one scenarios based on the received configuration instructions.

Preferably, in the application model generation device based on hierarchy structure as disclosed herein, the application model generation and storage module 3 is further configured to update and/or modify one or more of the at least one application model based on the received configuration instructions.

Preferably, in the application model generation device based on hierarchy structure as disclosed herein, each of the at least one scenarios corresponds to each application scenario of an application demand (e.g., the charging scenario in the financial field) respectively.

Preferably, in the application model generation device based on hierarchy structure as disclosed herein, each of the at least one application models corresponds to each application scheme of an application demand (e.g., the charging scheme in the financial field) respectively.

Preferably, in the application model generation device based on hierarchy structure as disclosed herein, each of the at least one meta-application algorithm units corresponds to each most basic function unit of an application demand (e.g., "the single transaction price making algorithm" and "the transaction range algorithm" in the financial field) respectively.

Preferably, in the application model generation device based on hierarchy structure as disclosed herein, each of the algorithm factors has a unique algorithm factor identifier associated with it.

Preferably, in the application model generation device based on hierarchy structure as disclosed herein, each of the at least one meta-application algorithm units includes at least one algorithm factor identifier, and the algorithm factors corresponding to the at least one algorithm factor identifiers are called by means of the at least one algorithm factor identifiers.

Preferably, in the application model generation device based on hierarchy structure as disclosed herein, each of the at least one meta-application algorithm units has a unique meta-application algorithm unit identifier associated with it.

Preferably, in the application model generation device based on hierarchy structure as disclosed herein, the scenario file includes at least one meta-application algorithm unit identifiers, and the meta-application algorithm units corresponding to the at least one meta-application algorithm unit identifiers are called by means of the at least one meta-application algorithm unit identifiers, wherein the meta-application algorithm units corresponding to the at least one meta-application algorithm unit identifiers constitute the scenarios defined by the scenario file.

Preferably, in the application model generation device based on hierarchy structure as disclosed herein, each of the at least one scenarios has a unique scenario identifier associated with it.

Preferably, in the application model generation device based on hierarchy structure as disclosed herein, the application model file includes at least one scenario identifiers, and the scenarios corresponding to the at least one scenario identifiers are called by means of the at least one scenario identifiers, wherein the scenarios corresponding to the at least one scenario identifiers constitute the application model defined by the application model file.

Preferably, in the application model generation device based on hierarchy structure as disclosed herein, each of the at least one application models has a unique application model identifier associated with it.

Preferably, in the application model generation device based on hierarchy structure as disclosed herein, the execution instruction includes the application model identifier.

Preferably, in the application model generation device based on hierarchy structure as disclosed herein, the application model execution model 6 implements the application model associated with the application model identifier based on the application model identifier in the received execution instruction (implementing an application model means building an application program by taking the application model as a template and running the application program to implement related transaction processing procedure).

Preferably, in the application model generation device based on hierarchy structure as disclosed herein, the types of the configuration instruction includes "meta-application algorithm unit configuration instruction," "scenario configuration instruction," "application model configuration instruction," and "algorithm factor configuration instruction."

Preferably, in the application model generation device based on hierarchy structure as disclosed herein, the configuration instruction is built by the user based on the actual application demands.

Preferably, in the application model generation device based on hierarchy structure as disclosed herein, the algorithm factor configuration instructions are built by the user based on the actual application demands before implementing the application model, and one or more of the algorithm factors are updated and/or modified by means of the algorithm factor configuration instructions so as to implement flexible expansion for the application models.

Preferably, in the application model generation device based on hierarchy structure as disclosed herein, the scenario configuration instructions are built by the user according to the scenario factors (e.g., in the financial filed, the scenario factors includes "institution role," "the transaction mode," "the countries/regions in which the transactions are accepted" and so on).

Preferably, in the application model generation device based on hierarchy structure as disclosed herein, the same algorithm factor can be used in different meta-application algorithm units.

Preferably, in the application model generation device based on hierarchy structure as disclosed herein, the same meta-application algorithm unit can be used in different scenarios.

Preferably, in the application model generation device based on hierarchy structure as disclosed herein, the same scenario can be used in different application models.

Figure 2:
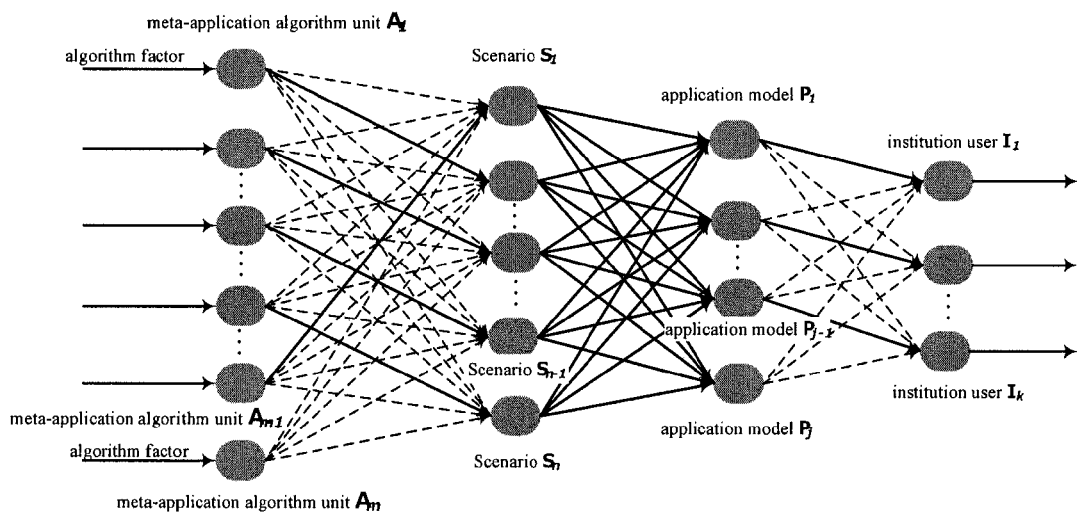
FIG. 2 is the structural diagram of the application model generated by the application model generation device or method based on hierarchy structure according to the embodiment of the invention.

FIG. 2 is a structural diagram of an application model generated by the application model generation device or method based on hierarchy structure according to the embodiment of the invention. As shown in FIG. 2, the solid lines represent one-to-one relationships, whereas the dotted lines represent configurable relationships. As can be seen above, due to the implementation of the reusability of algorithm factors, meta-application algorithm units and scenarios, the efficiency of configuration is increased and the complexity of the configuration process is decreased.

Figure 3:
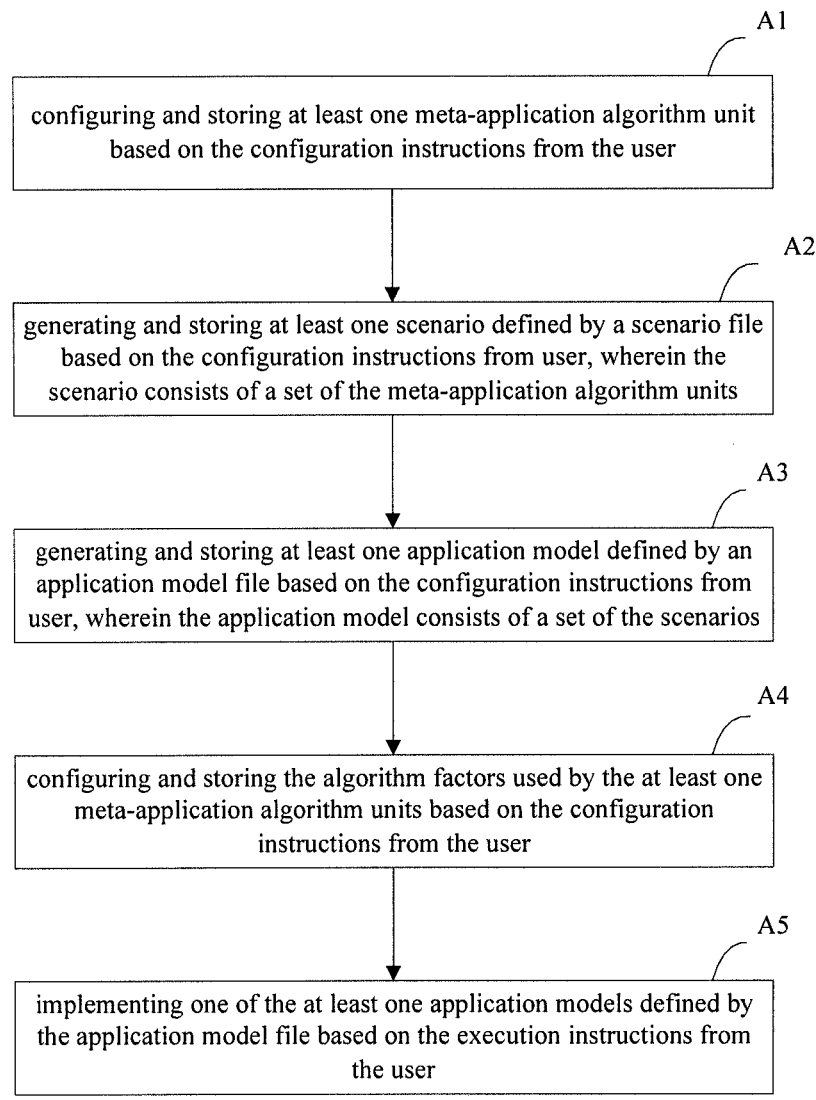
FIG. 3 is the flowchart of an application model generation method based on hierarchy structure according to the embodiment of the invention.

FIG. 3 is the flowchart of the application model generation method based on hierarchy structure according to the embodiment of the invention. As shown in FIG. 3, the application model generation method based on hierarchy structure as disclosed herein comprises the following steps:

(A1) configuring and storing at least one meta-application algorithm unit based on the configuration instructions from the user;

(A2) generating and storing at least one scenario defined by a scenario file based on the configuration instructions from user, wherein the scenario consists of a set of the meta-application algorithm units (that is, each scenario includes one or more of the meta-application algorithm units);

(A3) generating and storing at least one application model defined by an application model file based on the configuration instructions from user, wherein the application model consists of a set of the scenarios (that is, each application model includes one or more of the scenarios);

(A4) configuring and storing the algorithm factors (i.e., parameters, such as "transaction type", "fixed amount", or "rate", etc. in the financial field) used by the at least one meta-application algorithm units based on the configuration instructions received from the user;

(A5) implementing one of the at least one application models defined by the application model file based on the execution instructions from the user.

Preferably, in the application model generation method based on hierarchy structure as disclosed herein, the step (A1) further includes: updating and/or modifying one or more of the at least one meta-application algorithm units based on the configuration instructions from the user.

Preferably, in the application model generation method based on hierarchy structure as disclosed herein, the step (A2) further includes: updating and/or modifying one or more of the at least one scenario based on the configuration instructions from the user.

Preferably, in the application model generation method based on hierarchy structure as disclosed herein, the step (A3) further includes: updating and/or modifying one or more of the at least one application models based on the configuration instructions from the user.

Preferably, in the application model generation method based on hierarchy structure as disclosed herein, each of the at least one scenarios corresponds to each application scenario of an application demand (e.g., the charging scenario in the financial field) respectively.

Preferably, in the application model generation method based on hierarchy structure as disclosed herein, each of the at least one application models corresponds to each application scheme of an application demand (e.g., the charging scheme in the financial field) respectively.

Preferably, in the application model generation method based on hierarchy structure as disclosed herein, each of the at least one meta-application algorithm units corresponds to each most basic function unit of an application demand (e.g., "single transaction price making algorithm" and "transaction range algorithm" in the financial field) respectively.

Preferably, in the application model generation method based on hierarchy structure as disclosed herein, each of the algorithm factors has a unique algorithm factor identifier associated with it.

Preferably, in the application model generation method based on hierarchy structure as disclosed herein, each of the at least one meta-application algorithm units includes at least one algorithm factor identifier, and the algorithm factors corresponding to the at least one algorithm factor identifiers are called by means of the at least one algorithm factor identifiers.

Preferably, in the application model generation method based on hierarchy structure as disclosed herein, each of the at least one meta-application algorithm units has a unique meta-application algorithm unit identifier associated with it.

Preferably, in the application model generation method based on hierarchy structure as disclosed herein, the scenario file includes at least one meta-application algorithm unit identifiers, and the meta-application algorithm units corresponding to the at least one meta-application algorithm unit identifiers are called by means of the at least one meta-application algorithm unit identifiers, wherein the meta-application algorithm units corresponding to the at least one meta-application algorithm unit identifiers constitute the scenarios defined by the scenario file.

Preferably, in the application model generation method based on hierarchy structure as disclosed herein, each of the at least one scenarios has a unique scenario identifier associated with it.

Preferably, in the application model generation method based on hierarchy structure as disclosed herein, the application model file includes at least one scenario identifiers, and the scenarios corresponding to the at least one scenario identifiers are called by means of the at least one scenario identifiers, wherein the scenarios corresponding to the at least one scenario identifiers constitute the application model defined by the application model file.

Preferably, in the application model generation method based on hierarchy structure as disclosed herein, each of the at least one application models has a unique application model identifier associated with it.

Preferably, in the application model generation method based on hierarchy structure as disclosed herein, the execution instruction includes an application model identifier.

Preferably, in the application model generation method based on hierarchy structure as disclosed herein, the step (A5) further includes: implementing the application model associated with the application model identifier based on the application model identifier in the execution instruction (implementing an application model means building an application program with the application model being taken as a template and running the application program to implement related transaction processing procedure).

Preferably, in the application model generation method based on hierarchy structure as disclosed herein, the configuration instruction is built by the user based on the actual application demand.

Preferably, in the application model generation method based on hierarchy structure as disclosed herein, updating and/or modifying one or more of the algorithm factors based on the actual application demand before implementing the application model, thus implementing flexible expansion for the application models.

Preferably, in the application model generation method based on hierarchy structure as disclosed herein, configuring the scenario according to the scenario factors (e.g., in the financial filed, the scenario factors includes "institution role," "transaction mode," and "countries/regions in which the transactions are accepted").

Preferably, in the application model generation method based on hierarchy structure as disclosed herein, the same algorithm factor can be used in different meta-application algorithm units.

Preferably, in the application model generation method based on hierarchy structure as disclosed herein, the same meta-application algorithm unit can be used in different scenarios.

Preferably, in the application model generation method based on hierarchy structure as disclosed herein, the same scenario can be used in different application models.

Although the present invention has been described based on the above preferred embodiments, the implementation of the invention is not limited to these embodiments. It should be appreciated that different change and modification may be made to the present invention by one skilled in the art without departing from the spirit and scope of the present invention.

The invention claimed is:

1. An application model generation device based on hierarchy structure,
comprising:
a memory configured to store configuration instructions;
a meta-application algorithm unit updating and storage module, configured to store at least one meta-application algorithm unit, and update one or more of the at least one meta-application algorithm units based on the configuration instructions, wherein each of the at least one meta application algorithm units is an atom algorithm unit;
a scenario generation and storage module, configured to generate and store at least one scenario defined by a scenario file based on the configuration instructions, wherein the scenario includes a set of the meta-application algorithm units;
an application model generation and storage module, configured to generate and store at least one application model defined by an application model file based on the configuration instructions, wherein the application model includes a set of the scenarios;
an algorithm factor updating and storage module, configured to store algorithm factors used by the at least one meta-application algorithm unit, and update one or more of the algorithm factors based on the configuration instructions;
a user interface, configured to receive the configuration instructions from the user, and transmit the configuration instructions to one of the meta-application algorithm updating and storage module, the scenario generation and storage module, the application model generation and storage module, and the algorithm factor updating and storage module based on the type of the configuration instructions;
an application model execution module including a processor configured to execute the configuration instructions.

2. The application model generation device of claim 1, characterized in that, the scenario generation and storage module is further configured to update and/or modify one or more of the at least one scenarios based on the configuration instructions.

3. The application model generation device of claim 2, wherein the application model generation and storage module is further configured to update one or more of the at least one application models based on the configuration instructions.

4. The application model generation device of claim 3, wherein each of the at least one scenarios corresponds to each application scenario of an application demand respectively.

5. The application model generation device of claim 4, wherein each of the at least one application models corresponds to each application scheme of an application demand respectively.

6. The application model generation device of claim 5, wherein each of the at least one meta-application algorithm units corresponds to each most basic function unit of an application demand respectively.

7. The application model generation device of claim 6, wherein each of the algorithm factors has a unique algorithm factor identifier associated with it.

8. The application model generation device of claim 7, wherein each of the at least one meta-application algorithm units includes at least one algorithm factor identifier, and the algorithm factors corresponding to the at least one algorithm factor identifiers are called by means of the at least one algorithm factor identifier.

9. The application model generation device of claim 8, wherein each of the at least one meta-application algorithm units has a unique meta-application algorithm unit identifier associated with it.

10. The application model generation device of claim 9, wherein the scenario file includes at least one meta-application algorithm unit identifiers, and the meta-application algorithm units corresponding to the at least one metaapplication algorithm unit identifiers are called by the at least one meta-application algorithm unit identifiers, wherein the meta-application algorithm units corresponding to the at least one meta-application algorithm unit identifiers constitute the scenarios defined by the scenario file.

11. The application model generation device of claim 10, wherein each of the at least one scenarios has a unique scenario identifier associated with it.

12. The application model generation device of claim 11, wherein the application model file includes at least one scenario identifiers, and the scenarios corresponding to the at least one scenario identifiers are called by the at least one scenario identifiers, wherein the scenarios corresponding to the at least one scenario identifiers constitute the application model defined by the application model file.

13. The application model generation device of claim 12, wherein each of the at least one application models has a unique application model identifier associated with it.

14. The application model generation device of claim 13, wherein the execution instruction includes an application model identifier.

15. The application model generation device of claim 14, wherein the application model execution model implements the application model associated with the application model identifier based on the application model identifier in the received execution instruction.

16. The application model generation device of claim 15, wherein the types of the configuration instruction includes "meta-application algorithm unit configuration instruction," "scenario configuration instruction," "application model configuration instruction," and "algorithm factor configuration instruction."

17. The application model generation device of claim 16, wherein the configuration instruction is built by the user based on application demands.

* * * * *